INVENTOR.
ROBERT S. KING

INVENTOR.
ROBERT S. KING
BY Gregory J. Nelson

INVENTOR.
ROBERT S. KING

United States Patent Office 3,474,032
Patented Oct. 21, 1969

3,474,032
PROCESS AND APPARATUS FOR CHEMICAL
FEED
Robert S. King, Tucson, Ariz., assignor to Fuller Company, Catasauqua, Pa., a corporation of Delaware
Filed May 11, 1967, Ser. No. 643,779
Int. Cl. C02c 5/12, 5/02
U.S. Cl. 210—42        14 Claims

ABSTRACT OF THE DISCLOSURE

An apparatus and process for controlling lime feed to a chemical treating process wherein the conductivity of the solution varies with lime addition to and through an extreme value by biasing a sample of the untreated solution to determine the current relative extreme value of conductivity. The conductivity of the treated product and the current relative value of the extreme conductivity are compared and the rate of chemical feed adjusted to maintain a predetermined difference between these values.

This invention relates to a simple and economical apparatus and process for automatically controlling the addition of a chemical to process. More specifically my invention deals with the controlling lime addition to the treatment of an aqueous solution to maintain the treated solution automatically at any desired degree of treatment.

It is an object of this invention to provide an improved control apparatus and process which detects changes in the conductivity of a liquid due to variations in dissolved solids content in the sample and controls addition of lime therefrom. Specifically, my invention makes it unnecessary to determine absolute values of conductivity as control is based on the difference in the minimum conductivity and current conductivity of the treated water.

A broad object of my invention is to provide an apparatus and process for controlling chemical feed to a treating process to maintain a substantially constant effluent product regardless of changes in process variables such as flow, quality, or quantity.

Another object of my invention is to provide a control process and apparatus that is based upon detection of a predictable variation in a process with control of chemical addition by reference to that condition.

A specific object of this invention is to provide an electromechanical apparatus for controlling rate of chemical feed from a comparison of measured conductivity.

Another specific object of this invention is to provide a method and apparatus for automatically regulating lime feed to a water treating unit to obtain a desired product by continuously establishing the current extreme value of conductivity and monitoring the conductivity of the treated water and controlling the rate of chemical feed to maintain a predetermined difference between them.

My invention avoids the problems caused by rapid variations in water characteristics and flow, and provides a highly reliable system requiring a minimum of operator attention.

Automation of chemical control to processes such as lime feed in water softening systems has usually taken the form of flow proportioning. The dependability of such control systems is questionable, as many variables such as changes in raw water characteristic and chemical feeder accuracy may adversely affect the control accuracy of these devices.

Improved feed control in the lime softening field can be obtained by using pH instrumentation or automatic titration equipment. These systems suffer from inherent problems such as difficulty in selecting a proper sampling point, lag in feeder pacing, and maintenance problems.

A more recent approach, as shown in co-pending patent application Ser. No. 512,216, utilizes the first practical application of conductivity ratio control of lime feed. This method balances the conductivity of a sample of raw water with a sample of treated water and controls the feed therefrom. While this conductivity ratio control has proven effective in many applications, there are some problems such as unequal fouling of the measuring cells causing erroneous balance readings between the two cells.

In order to overcome the inadequacies of prior art chemical control, which is simple, accurate, dependable, chemical control systems, I have discovered a conductivity and reduces the complexity of the sensing system and eliminates the "cell balance" requirements of prior art conductivity ratio systems.

The principle that my invention utilizes is that in a lime treated water the conductivity progressively decreases to a minimum during precipitation of bicarbonate hardness. After essentially complete precipitation of the bicarbonates has occurred the conductivity then begins to increase upon further lime treatment. The following represents some of the typical reactions involved in lime softening of a normal water:

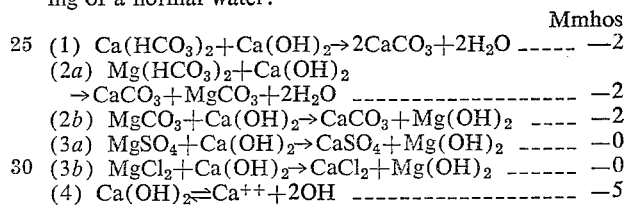

|  | Mmhos |
|---|---|
| (1) $Ca(HCO_3)_2 + Ca(OH)_2 \rightarrow 2CaCO_3 + 2H_2O$ | −2 |
| (2a) $Mg(HCO_3)_2 + Ca(OH)_2$ $\rightarrow CaCO_3 + MgCO_3 + 2H_2O$ | −2 |
| (2b) $MgCO_3 + Ca(OH)_2 \rightarrow CaCO_3 + Mg(OH)_2$ | −2 |
| (3a) $MgSO_4 + Ca(OH)_2 \rightarrow CaSO_4 + Mg(OH)_2$ | −0 |
| (3b) $MgCl_2 + Ca(OH)_2 \rightarrow CaCl_2 + Mg(OH)_2$ | −0 |
| (4) $Ca(OH)_2 \rightleftharpoons Ca^{++} + 2OH$ | −5 |

Reactions 1, 2a, 2b show a bicarbonate reduction. In these reactions the treated water conductivity is reduced by approximately 2 micromhos for each part per million of bicarbonate removed. Reactions 3a and 3b, typical of magnesium hydroxide precipitations as found in complete lime softening, do not affect the conditivity, as equivalent amounts of soluble calcium salts are produced. Equation 4 provides the key to conductivity control of lime feed. As calcium hydroxide no longer reacts to precipitate bicarbonate, an excess of calcium hydroxide is present. As calcium hydroxide dissolves in water the dissociation produces an increase of approximately 5 micromhos per part per million of calcium hydroxide added. A more complete understanding of my invention will be apparent from the following specification and drawings in which:

Figure 1:
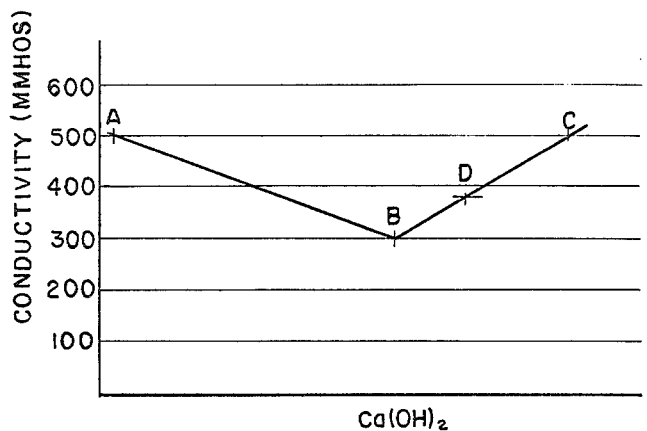
FIGURE 1 shows graphically the decrease and subsequent increase through a reduction of bicarbonate alkalinity with continuing lime feed.

Referring to FIGURE 1, conductivity change can be adapted through proper instrumentation to provide effective lime feed control. Assuming a raw water having an initial conductivity of 500 micromhos (point A), addition of lime reduces the conductivity of the water to a minimum value indicated by point B, through the reduction of bicarbonate alkalinity. As lime feed is continued, an excess of calcium hydroxide occurs, and a rapid increase in conductivity is observed; indicated by the reverse slope of the conductivity curve past the set-point D through point C.

My control continuously monitors the conductivity of a stream of liquid undergoing treatment. On a cyclic or programmed basis untreated or raw water is blended into and out of a sample stream of treated liquid. The treated sample contains excess lime, assuming the set-point at D of FIGURE 1, and as raw water and sample blend the conductivity of the resultant mixture of raw and treated water is driven through the region of minimum conductivity into a region of higher conductivity due to increasing bicarbonate alkalinity. As some time interval thereafter, the raw water is slowly blended out and the conductivity again is driven through the region of minimum conductivity. On each sampling cycle, which is a predetermined time interval, the control detects the current minimum conductivity obtainable by lime treatment of the raw water and the current conductivity of the sample from the treating unit. Once during each sample cycle a control signal is given to either correct or verify the last lime feed adjustment. In this manner the control has recalibrated itself, located the minimum conductivity point, compared the difference in values of the conductivity of the liquid under current lime treatment and the minimum conductivity with that difference required by the set-point and sent out a correction or verification of the feed setting based on this comparison.

Figure 2:
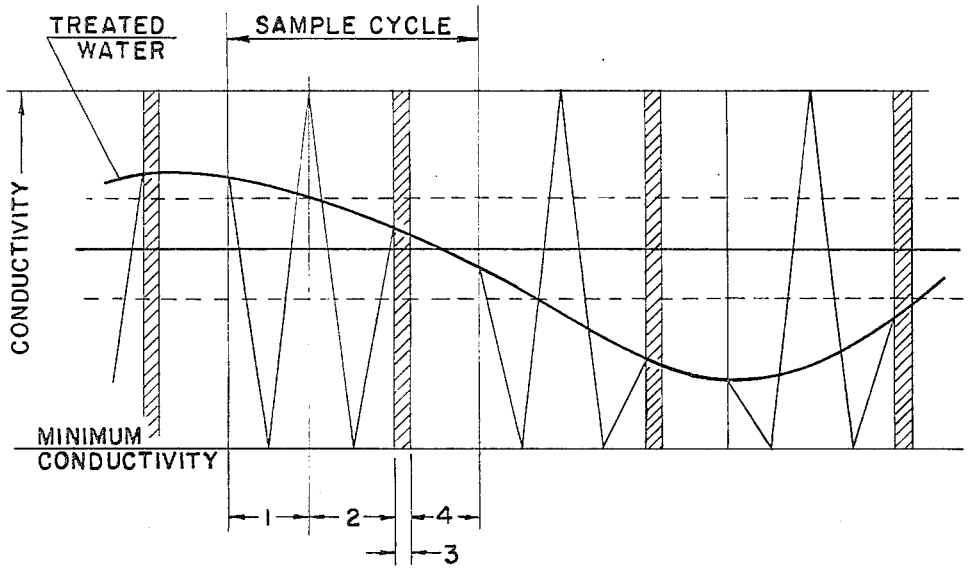
FIGURE 2 shows graphically a series of sample cycles compared with the conductivity of the treated water over a period of time.

The significance of the programmed control cycle and the two conductivity points thus established are best demonstrated by reference to FIGURE 2. This figure shows the variation of the conductivity of the treated water and the variation of the sample of treated water, over a period of several time cycles, between the upper and lower limits of conductivity.

The minimum conductivity reference line corresponds to the minimum point B of the curve on FIGURE 1. The upper limit of conductivity is arbitrary and corresponds to about point C of FIGURE 1. The set-point corresponds to point D of FIGURE 1, and is the desired degree of treatment of the raw water, a value which can be established by conventional chemical tests. The dotted horizontal lines on either side of the set-point are the upper and lower limits of the deadband, that is, the permissible range of variation from the set point without corrective action being taken. Upon the initiation of the timed or programmed sample cycle (time interval 1) raw water is blended with the sample of treated water from the unit and the conductivity of the blend is monitored. The conductivity is driven downward through the region of minimum conductivity and then back to a point of greater conductivity as the hydroxide excess in the treated water sample is utilized by the raw water. Time interval 2 represents the change in conductivity as the flow of raw water to the sample is slowly decreased and the conductivity cell detects the change as the excess hydroxide predominates and the conductivity again begins to increase. During time interval 3, shown in cross hatching, the control signal is given and a verification or correction of the rate of lime feed occurs, depending on the relative difference of values of conductivity compared to that difference required by the set-point at the end of interval 2. Interval 4 is the run-out period to the beginning of the next timed control cycle. Each sample cycle lasts long enough, based on the process, for the reactions to proceed and for any feed rate change to be detected, and I use approximately a 5 minute cycle for control of lime softening, each of intervals 1, 2, 3, and 4 are individually adjusted to be commensurate with the requirements of the process. In FIGURE 2, I have shown the change from interval 1 to interval 2 to be immediate. However, in the case of lime treatment it has proven to be advantageous to maintain the flow of raw water at maximum for a short period of time before blending the raw water slowly out, as the raw water acts to keep the conductivity electrode free from fouling with lime. The untreated raw water has an affinity for the lime and acts to rinse the lime from the electrode as it flows past the electrode.

If at the completion of interval 2 of the sample cycle, treated water conductivity is below the set-point, my control calls for an increase in the lime feed rate. The effect of this increase is then detected in the next sample cycle. If still more lime feed is required, a second lime feed rate increase signal is given on the subsequent control cycle. If, on the next program, the sample conductivity is above the set-point, in the feed decrease region, the control then signals a decrease in lime feed rate. It can easily be seen that this continuous "hunting" maintained within very narrow limits, assures proper lime feed control regardless of changes in raw water composition, treating plant flow rate, lime feeder accuracy, or lime quality. The absolute conductivity difference between the set-point and minimum conductivity is maintained constant, although this difference can be adjusted through change of set-point to change the degree of treatment. FIGURE 2 shows the variation of the treated water sample over several sample cycles and the effect of corrections made to the lime feed rate. For instance, at the left of this FIGURE the treated water conductivity is above set-point and a decrease feed corrective signal is given thus causing the subsequent downwardly slope of the treated water curve.

Figure 3:
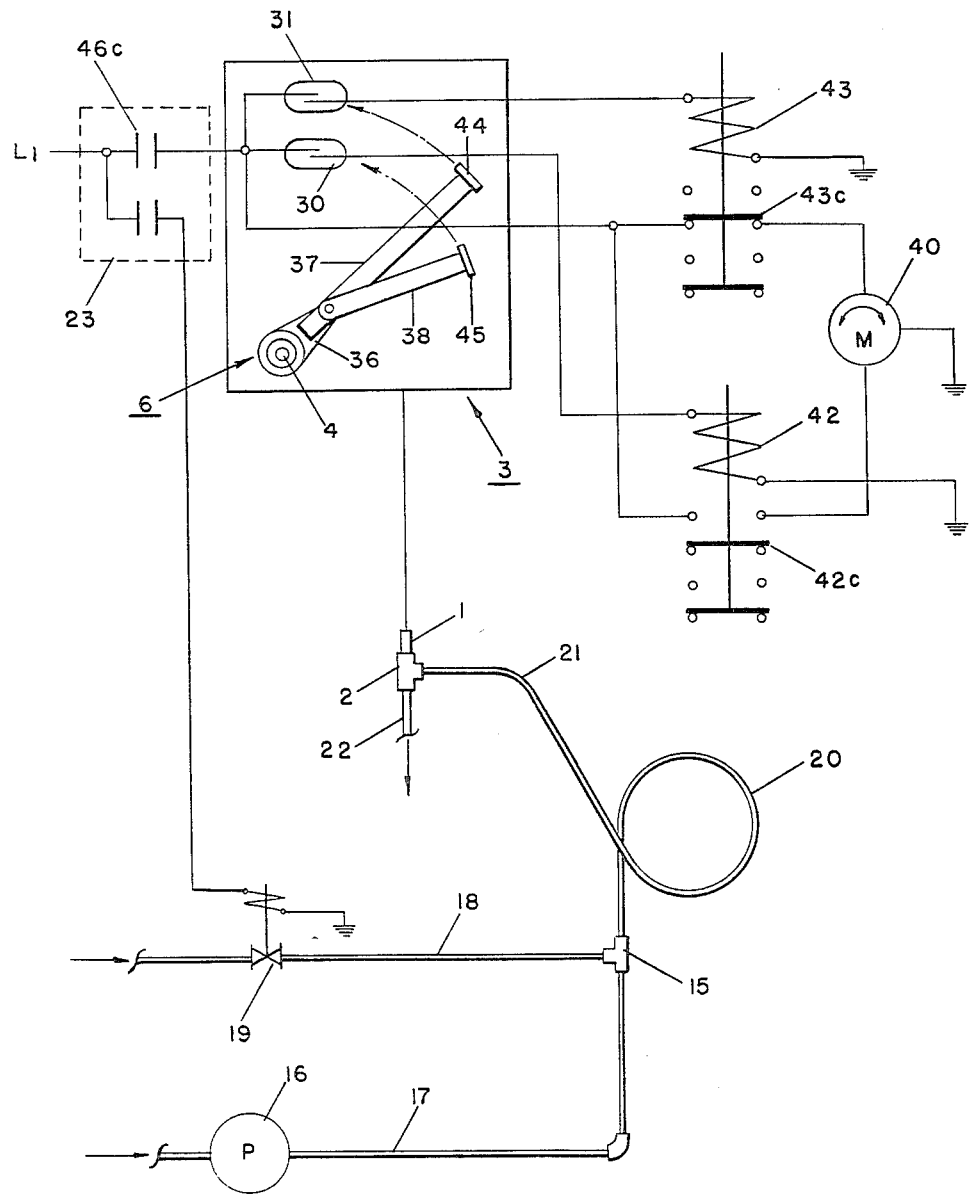
FIGURE 3 shows my control system in a diagrammatic view.
Figure 5:
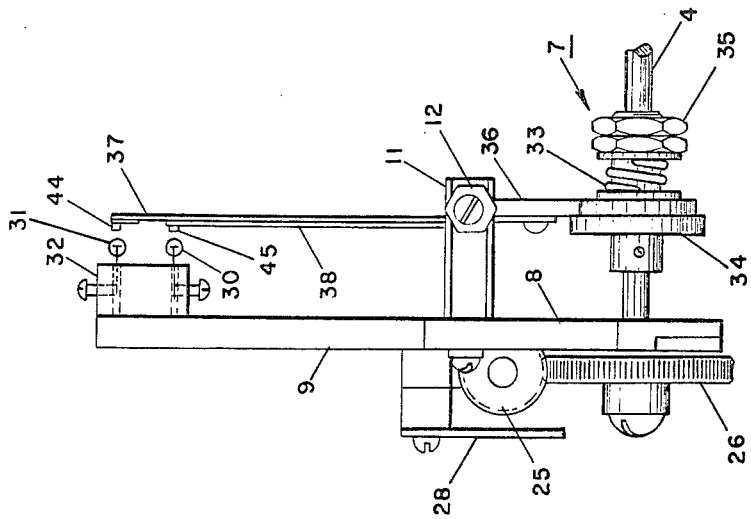
FIGURE 5 is a side elevational view of the switch frame assembly of FIGURE 4.
Figure 4:
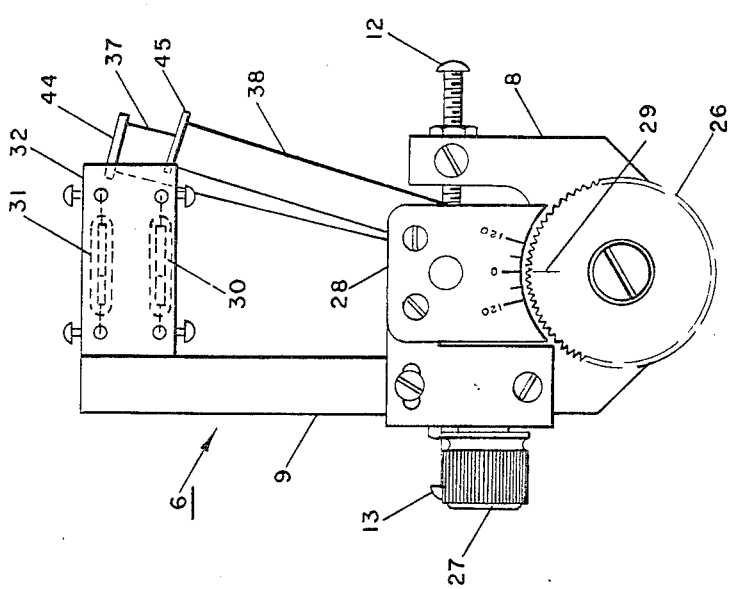
FIGURE 4 is the front elevational view of the switch frame assembly that is mounted on a conductivity instrument and forms an important part of my invention.

My invention will be more readily understood by referring to FIGURES 3, 4, and 5 which show in detail the mechanical and electrical features of my control.

FIGURE 3 shows a schematic diagram wherein 1 is a conductivity sensing cell of the electrode type for sensing the electrical conductivity of fluids. Cell 1 is screwed into the run of the T 2 with the electrode extending into the tee and electrically connected to a conductivity measuring instrument 3 containing a self-balancing reversing motor having an output which is directionally responsive to the measured conductivity, that is, the motor rotates in one direction when the conductivity is rising and in the other when it is decreasing. The conductivity cell 1, and the conductivity instrument 3 are of standard manufacture, such as, the RI 3 manufactured by Beckman Instrument Company of Cedar Grove, N.J.

Shaft 4, geared to the reversing motor of the conductivity instrument 3 is adapted to carry a switch frame assembly 6 having arms 37 and 38, which rotate to a position whereby switches 30 and 31 are made, actuating relay coils 43 and 42 and associated contacts 43c and 42c to drive feed rate control reversing motor 40 is a direction to either increase or decrease the rate of chemical feed. The operation of the switch frame 6 is discussed in greater detail with reference to FIGURES 4 and 5.

Sample pump 16 provides a constant supply of treated water from the process from a selected point within the treating unit, for instance, from within the inner draft tube of a solids contact type water treating unit. The sample flows through conduit 17 and at T 15 is joined by conduit 18 which intermittently blends in raw water under the control of the program controlled, electrically operated valve 19. The liquid then flows to the cell holding T 2 through the sample integrity preserving coil 20. The coil 20, which comprises about 40 feet or so of coiled tubing, effects complete and intimate mixing of each increment of the raw and treated water and maintains the uniformity and integrity of each increment of the resultant sample which enters the leg of T 2 from line 21. Line 22 on the runm of T 2 carries the blended sample, after it passes by conductivity cell 1, to waste or back to the treating unit. Timer 23 controls the sample cycle and can be any conventional timer device or program controller commercially available for regulating the sequence and duration of operations, for example, the Multiflex timer manufactured by the Eagle Signal Corporation. Timer 23 is connected to a source of power L1 and operates valve 19 to intermittently open and close this valve, controlling the blending in and out of raw water. Also, after the completion of the blending in and out operation contact 46c of timer 23 closes causing a circuit to be made from L1 to the switches 30 and 31, and depending upon the conductivity of the treated water, and the resultant open or closed condition of these switches as caused by the relative magnets 44 and 45 locations, as established by rotation of switch arm 36 by shaft 4, the control circuit either verifies or corrects the last chemical feed adjustment.

Referring to FIGURES 4 and 5, switch frame assembly 6 affixed to the output shaft 4 of the conductivity instrument includes stationary frame member 8 with threaded spacer 11 extending therefrom. Inserted into the threaded spacer 11 is bolt 12 which acts as an adjustable stop. Switch arm 9, is rotatably adjustable about shaft 4 through the action of worm 25 acting on gear 26. Gear 26 is fixedly mounted to frame 8 and centered about shaft 4. Worm 25 is affixed to arm 9 and is rotatably engaged to gear 26 and can be turned by knob 27. Indicator scale 28, reading against vertical scribe mark 29 on gear 26, provides a visual means of checking the adjustment of arm 9. Affixed to the upper end of arm 9 is circuit board 32 made of lucite or other electrical insulating material. Mounted to the board 32, on its rear side, are switches 30 and 31 which are respectively, in a circuit from the timer 23 to relay 43, relay 42, and to reversing motor 40. The switches 30 and 31 in the preferred embodiment are Reed switches of the type that are magnetically actuated.

The clutch assembly 7, mounted on shaft 4 as more clearly seen in FIGURE 5, includes a sleeve 34 pressed on or held against shaft 4 by a set screw. Sleeve 34 had a collar at one end and is threaded at its other end. Arm 36 is held in place against the collar of sleeve 34 by spring 33 compressed and held by lock nuts 35. Adjustably affixed to arm 36 are arms 37 and 38 to which are mounted at their upper ends magnets 44 and 45 in a spaced apart relationship from switches 30 and 31. It will be understood that arms 37 and 38 are of a length so that when they are each in an opposite position the magnets at their upper ends coincide with switches 30 and 31. Also there is an angular displacement between bars 37 and 38 so that magnet 44 will be in an actuating position with respect to its associated switch 31 when shaft 4 is rotating counterclockwise before magnet will be in an actuating position with respect to its switch 30.

As mentioned the clutch assembly is mechanically coupled to the output shaft 4 of the conductivity instrument 3, which rotates directionally according to increasing or decreasing conductivity. It will be obvious the arm 36 and the magnet arms 37 and 38 will engage stops 12 and 13, and thereafter shaft 4 and sleeve 34 will be free to turn against the clutch friction.

A more complete understanding of my invention will be obvious from the following description of operation wherein the set-point is maintained to treat a water with a slight excess of lime.

Sample pump 16, delivers through conduits 17 and 21, a continuous flow of treated water to T 2 past the conductivity cell 1. The treated water sample is selected from a region within the treating unit to provide the optimum combination of sample uniformity, the earliest response to chemical treatment, and minimum system "lag" time. The program timer 23 electrically operates the raw water valve 19 located in raw water line 18 to blend raw water according to the sample cycle into the treated water. The two streams, raw water and sample water, are completely mixed in the sample integrity retention coil 20. As discussed above and as is shown in FIGURE 2, the valve 19, slowly blends in raw water and the conductivity is driven through the minimum conductivity and then back to a point of greater conductivity as the hydroxide excess in the sample is utilized. The valve 19 slowly begins to close and the conductivity decreases to the minimum and begins to increase. At a time interval after the end of the sample blending cycle, the program timer 23 energizes the control circuit as contact 46c closes connecting the circuit with a source of power L1 for a predetermined interval of time. If the continuous treated water sample conductivity is below the set-point an increase in feed is called for, or if the conductivity is above the set-point, a decrease is called for and the motor 40 makes a feed rate change. This is accomplished by the switch frame 6 and electrical circuit arrangement. During the sampling cycle the current minimum conductivity and the current conductivity of the sample from the treating unit are established. Shaft 4 of the conductivity instrumentation, rotatively responds to these measured changes and switches 30 and 31 will be actuated although no corresponding feeder rate adjustments will be made because the program timer has not completed the circuit through contact 46c to L1. After the completion of the sampling cycle, the control interval begins which normally will only last for a few seconds. Three circuit possibilities exist during the control interval as the sample of treated water may be undertreated (below set-point), overtreated (conductivity above the set-point), or the measured conductivity may be within the dead-band range of the set-point.

Examining these possibilities individually further illustrates the operation of my device. If the conductivity during the feed correcting interval has not reached the set-point as is shown in the last control cycle of FIGURE 2 the following happens: The counterclockwise rotation of shaft 4 has been insufficient to bring either arm 37 or 38 and their associated magnets 44 or 45 in close enough proximity to the switches 30 and 31 on board 32 to actuate either of them. This will result in the motor 40 calling for an increase in the rate of feed during the correction interval because contact 43c is normally closed and power will flow from L1, through contacts 46c in timer 23, through the power circuit 41, across contacts 43, and energize reversing motor 40 in a direction to increase the rate of chemical feed. Note that motor 40 is not the chemical feeder motor, but is a reversing motor mechanically coupled to the rate of feed controller controlling the chemical feeder. It should also be apparent that although the output of my system is a mechanical motion it may be translated in any way for pneumatic, electric, etc., for the control of chemical feed. Direct mechanical coupling is only illustrative.

If during the corrective interval of the cycle the conductivity value of the treated water coincided with the set-point dead-band as shown in the third control sequence of FIGURE 2, the following sequence of electrical and mechanical operations would occur. Shaft 4, in response to the measured conductivity of the treated water sample flowing past cell 1, would rotate counterclockwise until the magnet 44 located on bar 37 would come within close enough proximity to actuate switch 31 only. The closing of this switch energizes coil 43 causing contacts 43c to open, breaking the circuit to motor 40. Since no energy is going to motor 40, no correction of the lime feed rate is called for.

Finally, if the conductivity of the treated sample during the correction interval is above the set-point as shown on the first and second control cycle of FIGURE 2, a decrease in the feed rate is accomplished during the feed correction interval. The rise in conductivity causes rotation of shaft 4 to a point where both switches 30 and 31 are within the magnetic field of, and actuated by, magnets 44 and 45 on rotating arms 37 and 38. Both coils 42 and 43 are energized causing contact 43c to open and 42c to close. This completes a power circuit through contact 46 of timer 23, across contact 42c and to motor 40, energizing the windings of the motor causing rotation in the direction to decrease chemical feed.

It is obvious that the set-point can be changed by merely turning knob 27 and rotating arm 9 to change the relationship of switches 30 and 31 to their actuating magnets 44 and 45. Similarly the dead-band range can be changed by adjusting the angular relationship of arms 37 and 38.

My controller works equally as effectively if it is desired to undertreat the liquid, that is, if the set-point is such to maintain the treated liquid at point E on FIGURE 1. To achieve this only slight modifications are required.

Instead of blending raw water into the sample stream of treated water ahead of the conductivity cell, a lime rich solution which may be a lime slurry or solution, or a water having a hydroxyl excess is used to drive the controller to the minimum point and recalibrate itself. The relays 42 and 43 which are normally open and closed respectively must be reversed. It is obvious that the same control sample cycle is followed and that the controller again apyroaches the set-point through the minimum, and in this way control from a comparison of the minimum and current conductivities.

My control system is designed to make it unnecessary to know the absolute value of conductivity measurements of the treated water. Only one detection and one measurement are important in each control cycle—the instrument detects the current minimum conductivity of the treated water, and the current conductivity of the sample from the treating unit. Then my instrument compares the increment between that minimum and the treated water with the increment from the minimum, from the set-point, and controls therefrom. These measurements are all relative and the instrument continually recalibrates itself. Further and very important, my control device is not confused by identical numerical readings which are on opposite sides of the reversal point of the conductivity curve.

It will be apparent that my system is not limited to the control of lime feed to water treatment, but is unique and may be applied to any system wherein a variable of the process varies, with progressive chemical addition, in the V or inverted V shape as discussed. For example, my basic control scheme could control temperature, viscosity, density, pH and the like. It will be obvious to those skilled in the art to make changes in my system and apparatus or apply it to different control systems without departing from the letter and spirit of the disclosure.

I claim:

1. A method of regulating chemical feed to a treating process to maintain the quality of the treated product at a predetermined set-point wherein a measurable characteristic of treating process varies with addition of chemical to and through a reversal point comprising the steps of:
   (a) withdrawing a continuous sample of the treated product,
   (b) biasing the treated product sample to establish the current relative value of the reversal point of the measurable characteristic of the sample,
   (c) determining the current relative value of the measurable characteristic of the treated product, and
   (d) controlling the chemical feed to maintain a substantially constant difference between the current relative values of the measurable characteristics of the reversal point and of the treated product.

2. A method of regulating the lime feed to a water treating process to maintain the quality of the treated water at a predetermined set-point wherein the conductivity of the water varies with variations in dissolved mineral content to and through a reversal point comprising the steps of:
   (a) withdrawing a continuous sample of the treated water,
   (b) biasing the treated water sample to establish the current relative value of the reversal point of the conductivity,
   (c) determining the current relative conductivity of the treated water,
   (d) controlling the lime feed to maintain a substantially constant difference between the current relative values of the reversal point of the conductivity and of conductivity of the treated water.

3. The method of claim 2 wherein the water treating process is a solids contact recycle process.

4. The method of claim 2 wherein the treated water is biased to establish the reversal point of the conductivity by progressively blending raw water into and out of the treated water sample.

5. The method of claim 2 wherein the treated water is biased by progressively blending an aqueous lime rich solution into and out of the treated water.

6. A method of regulating lime feed to a water treating process to maintain the quality of the treated water at a predetermined set-point of at least complete precipitation of hardness imparting substance wherein the conductivity of the water varies with changes in hardness to and through a reversal point comprising the steps of:
   (a) withdrawing a continuous sample of treated water,
   (b) during a first predetermined time interval progressively supplying untreated water to the sample of treated water whereby the conductivity of the blend is caused to vary through a region of minimum conductivity and then increases to a maximum,
   (c) during a second predetermined time interval progressively diminishing the supply of untreated water whereby the conductivity of the stream decreases from a maximum to the current minimum conductivity and returns to the conductivity of the treated water,
   (d) during a third time interval comparing the conductivity of the treated water with the previously established current minimum conductivity and controlling the rate of lime feed from said comparison, and
   (e) continuously repeating said steps to maintain the conductivity substantially at the set-point.

7. A control apparatus for a chemical process in which a measurable characteristic varies with addition of chemical to and through a reversal point including chemical feed means comprising:
   (a) means for receiving a continuous supply of treated product,
   (b) means for biasing the continuous supply of treated product to establish the value of the reversal point of the measurable characteristic,
   (c) means for decting the relative value of the reversal point of the measurable characteristic,
   (d) means for detecting the current value of the measurable characteristic in the treated product,
   (e) means for comparing the current relative value of the measurable characteristic in the treated product and the relative value of the measurable characteristic, and
   (f) means for varying the rate of chemical feed to maintain a predetermined set-point in accordance with said comparison.

8. A control apparatus including means for feeding lime to a water treating process wherein the conductivity of the water varies to and through a reversal point with addition of lime comprising:
   (a) means for receiving a continuous sample supply of treated water,
   (b) means for biasing the sample supply of treated water to establish the reversal point of the conductivity,
   (c) means for measuring the current value of the conductivity of the treated water and,
   (d) means for varying the rate of lime feeding means in accordance with the comparative values of the reversal point and current values of conductivity to maintain a substantially constant predetermined difference between said values.

9. An apparatus for feeding lime to a liquid treating process to maintain a predetermined set-point wherein the conductivity of the water varies to and through a reversal point with addition of lime comprising:
   (a) a container for receiving a flow of liquid,
   (b) first conduit means for supplying a substantially constant flow of treated liquid to said container,
   (c) second conduit means for supplying raw liquid to said container, (d) control means in said second conduit for selectively regulating the flow of raw liquid whereby the conductivity of resultant liquid in said receiving means is regularly caused to vary to and through the reversal point,
(e) a conductivity measuring instrument including a cell in said receiving means, said conductivity instrument having an output related to the measured conductivity of the liquid within the cell,
(f) a cycle timer connected to a source of power,
(g) lime feeder means including means for controlling the rate of lime feed,
(h) a first power circuit connected to said cycle timer and said means for controlling the rate of lime feed,
(i) a second power circuit connected to said cycle timer and said means for controlling the rate of lime feed,
(j) a first relay in said first power circuit,
(k) a second relay in said second power circuit,
(l) a first control circuit from the cycle timer to the coil of said first relay including a first switch,
(m) a second circuit connected to the coil of said second relay including a second switch therein, and
(n) means responsive to the output of said conductivity instrument to selectively actuate said first and second switches thereby selectively energizing said first and second power circuits to regulate the rate of lime feed.

10. The apparatus of claim 9 wherein means for controlling the rate of lime feed is a reversing motor.

11. The apparatus of claim 10 wherein the timer is set to first selectively blend in and out the raw liquid and thereafter simultaneously places both power circuits and both control circuits in connection with a source of power.

12. The apparatus of claim 10 wherein means are provided for the complete mixing of raw and untreated water prior to entry into said receiving means.

13. The apparatus of claim 10 wherein the output of the conductivity instrument indicative of conductivity is a rotative movement and wherein said first and second switches are of the type which are magnetically actuated by first and second magnets rotated into the proximity of said first and second switches whereby said switches are selectively actuated in relation to the measured conductivity.

14. The apparatus of claim 13 wherein the set-point may be adjusted by adjusting the spaced apart relationship of the magnets and associated switches.

References Cited

UNITED STATES PATENTS

| | | | |
|---|---|---|---|
| 1,145,509 | 7/1915 | Pike et al. | 137—5 |
| 1,388,613 | 8/1921 | Simsohn | 23—253 X |
| 3,238,128 | 3/1966 | Gustafson | 210—46 |

MICHAEL E. ROGERS, Primary Examiner

U.S. Cl. X.R.

23—253; 137—5; 210—143